United States Patent [19]

Gruber et al.

[11] 4,126,737

[45] Nov. 21, 1978

[54] ANAEORBICALLY HARDENING ADHESIVES AND SEALANTS BASED ON (METH)ACRYLIC ESTERS CONTAINING REACTION PRODUCTS OF GLYCIDYL-(METH)ACRYLATE AND HALF ESTERS CONTAINING CARBONATE GROUPS

[75] Inventors: Werner Gruber, Düsseldorf-Gerresheim; Joachim Galinke, Langenfeld; Bernd Wegemund, Haan, all of Fed. Rep. of Germany

[73] Assignee: Henkel Kommanditgesellschaft auf Aktien (Henkel KGaA), Düsseldorf, Fed. Rep. of Germany

[21] Appl. No.: 770,448

[22] Filed: Feb. 22, 1977

[30] Foreign Application Priority Data

Feb. 27, 1976 [DE] Fed. Rep. of Germany ....... 2607961

[51] Int. Cl.$^2$ ............................ C08F 2/00; C08F 4/32; C08F 234/02; C08F 18/24

[52] U.S. Cl. .................... 526/270; 526/217; 526/218; 526/219; 526/220; 526/230; 526/269; 526/271; 526/273; 526/309; 526/314; 260/885

[58] Field of Search ............... 106/287; 260/885, 89.5, 260/77.5; 428/458, 463; 526/230, 320, 217, 269, 271, 218

[56] References Cited

U.S. PATENT DOCUMENTS

| | | | |
|---|---|---|---|
| 3,043,820 | 7/1962 | Krieble | 526/320 |
| 3,218,305 | 12/1965 | Krieble | 526/230 |
| 3,300,547 | 1/1967 | Gorman | 260/885 |
| 3,984,385 | 10/1976 | Gruber et al. | 526/230 |
| 3,991,261 | 11/1976 | Gruber et al. | 526/230 |

Primary Examiner—Hosea E. Taylor
Assistant Examiner—W. Thompson
Attorney, Agent, or Firm—Hammond & Littell

[57] ABSTRACT

Reaction products of glycidyl (meth)acrylate with half esters containing carbonate groups are components of anaerobically-setting adhesive compositions based on (meth) acrylic esters and organic peroxides.

20 Claims, No Drawings

ANAEROBICALLY HARDENING ADHESIVES AND SEALANTS BASED ON (METH)ACRYLIC ESTERS CONTAINING REACTION PRODUCTS OF GLYCIDYL-(METH)ACRYLATE AND HALF ESTERS CONTAINING CARBONATE GROUPS

FIELD OF THE INVENTION

The present invention relates to anaerobically hardening adhesives, sealing compounds, etc., based on mixtures of (meth)acrylic esters, which may be optionally substituted, and organic peroxides, particularly hydroperoxides. More specifically, it relates to compositions which harden rapidly in the absence of oxygen, based on (meth)acrylic esters and organic peroxides, particularly hydroperoxides, which are known as anaerobic adhesives, sealing compounds, and the like. They are preferably used in solvent-free form for the above-mentioned purposes. The invention includes methods for the preparation of these compositions.

As essential components these systems contain reaction products of glycidyl-(meth)acrylate with half esters containing carbonate groups. They can additionally contain (meth)acrylic esters of mono- or polyhydroxy alcohols, and organic peroxides or hydroperoxides, as well as small amounts of additional polymerizable compounds, and optionally other auxiliary substances. To ensure a sufficiently rapid hardening in the absence of oxygen, accelerators are added to the system.

RELATED ART

It is known that methacrylic esters or acrylic esters of various alcohols together with hydroperoxides yield mixtures which harden under exclusion of atmospheric oxygen and which can be used as adhesives and sealing compounds. If (meth)acrylic esters of cycloaliphatic alcohols are used, considerably high tensile shearing strength values are obtained, which are important, e.g. for fastening shafts.

Furthermore, it is important that these anaerobically hardening adhesives yield firm bonds between the objects to be bonded, even at higher temperatures. Another requirement is that the cemented joint have good flexibility. Consequently, anaerobically hardening adhesives and sealing compounds must have a number of beneficial properties which are difficultly reconcilable with each other.

OBJECTS OF THE INVENTION

A principal object of the present invention is the development of an anaerobically hardening adhesive and sealing compound based on methacrylic- or acrylic esters and organic peroxides or hydroperoxides, as well as small amounts of additional polymerizable compounds and optionally other auxiliary substances, containing as an essential component reaction products of glycidyl- (meth)acrylate with half esters containing carbonate groups.

Another object of the present invention is the development of an anaerobically hardening adhesive and sealing compound which polymerizes at room temperature, i.e. which hardens to an adhesive layer or sealing compound, yielding after a short time a loadable bond which is strong and shows good thermal stability and flexibility, even for non-ferrous materials, like aluminum and aluminum alloys.

Another object of the present invention is to provide a method for forming a strong, heat stable and flexible bond from the polymerization of an anaerobically hardening adhesive and sealing compound based on methacrylic- or acrylic esters and organic peroxides or hydroperoxides, as well as small amounts of additional polymerizable compounds and optionally other auxiliary substances, containing as an essential component reaction product of glycidyl(meth)acrylate with half esters containing carbonate groups.

These and other objects of the invention will become more apparent as the description thereof proceeds.

DESCRIPTION OF THE INVENTION

The present invention relates to novel anaerobically hardening adhesive and sealing compositions comprising (meth)acrylic esters and peroxide polymerization catalysts and as an essential component reaction products of glycidyl(meth)acrylate with half esters containing carbonate groups. The compositions may contain small amounts of one or more additional polymerizable compounds and other auxiliary substances, if desired, to optimize the properties of the compositions.

A special embodiment of the invention is an anaerobically setting adhesive and sealing composition comprising methacrylic- or acrylic acid esters and organic hydroperoxides and optionally small amounts of additional, polymerizable, unsaturated compounds and ordinary auxiliary substances, which contain 10 to 90% by weight, based on the total weight of the polymerizable portions of the composition, of compounds of the general formula

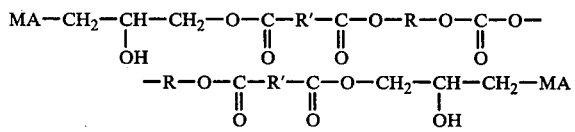

wherein R is a saturated or unsaturated hydrocarbon radical with 2 to 8 carbon atoms and R' is an aliphatic or cycloaliphatic radical, optionally containing double bonds, or an aromtic radical, and MA is the (meth)acrylic acid derived radical.

The diols containing a carbonate group which serve as a starting material for reaction with carboxylic acids or carboxylic acid derivatives have a molecular weight between about 150 and 400. They can be produced in known manner but they are also commercially available. These bis-hydroxyalkyl-carbonates can be prepared by reesterification of diethylcarbonates with the desired diols or by reacting ethyl chloroformate with diol and subsequent reesterification with other diols. The base catalyzed reesterification reactions are carried out with excess diol. It is not necessary to remove this excess diol after the reaction. The above diols can be used alone or in combination with each other.

This bis-hydroxyalkyl-carbonates are characterized by the formula

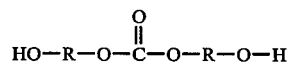

wherein R is a saturated or unsaturated aliphatic hydrocarbon radical with 2 to 8 carbon atoms. The radical R can be the same or different and is a straight or branched carbon chain with 2-8 carbon atoms, which can optionally contain double or triple bonds. Examples of such bis-hydroxyalkyl-carbonates are bishydroxyethyl-carbonate, bishydroxybutyl-carbonate, bishydroxyhexyl-carbonate, bishydroxyneopentyl-carbonate, hydroxyethyl-, hydroxybutynyl-carbonate, and hydroxyneopentyl-, hydroxybutynyl-carbonate.

The esterification of these bishydroxyalkyl carbonates with dicarboxylic acids or their derivatives, such as acid anhydrides, in a molar ratio of 1:2 of bishydroxyalkyl carbonate to acid or acid derivatives, is effected in known manner either in the melt or in inert solvents, optionally with the addition of suitable catalysts, at temperatures between 50° and 150° C., preferably between 80° and 120° C., and optionally in an inert gas atmosphere, such as nitrogen.

The dicarboxylic acid-derived component of the above-described bishydroxyalkyl carbonate esters can be aliphatic, cycloaliphatic, aromatic, combinations of aromatic and aliphatic, and substituted groups thereof. The aliphatic and cycloaliphatic dicarboxylic acids and acid anhydrides can be saturated or unsaturated, preferably ethylenically unsaturated. The aromatic dicarboxylic acid or acid anhydride preferably contains at least one phenylene radical, most preferably one such radical.

Cyclic anhydrides of dicarboxylic acids having five or six membered rings are preferred.

These are preferably alkanedioic acids and acid anhydrides having 2 to 6 carbon atoms in the alkane residue, alkenedioic acids and acid anhydrides having 2 to 6 carbon atoms in the alkene residue, benzene dicarboxylic acids and acid anhydrides, cycloalkane dicarboxylic acids and acid anhydrides having 5 to 8 carbons in the cycloalkane residue, cycloalkene dicarboxylic acids and acid anhydrides having 5 to 8 carbons in the cycloalkene residue, and endoalkylenecycloalkene dicarboxylic acids and acid anhydrides having 7 to 8 carbons in the endoalkylenecycloalkene residue.

Examples of suitable dicarboxylic acids or acid anhydrides are maleic acid anhydride, succinic acid anhydride, succinic acid, phthalic acid anhydride, cyclohexane dicarboxylic acid anhydride, maleic acid, tetrahydrophthalic acid anhydride, 1,2-cyclohexanedicarboxylic acid, and endomethylene-tetrahydrophthalic acid anhydride, etc.

The half esters formed from the above reaction of bishydroxyalkyl carbonates with dicarboxylic acids or their derivatives are characterized by the formula

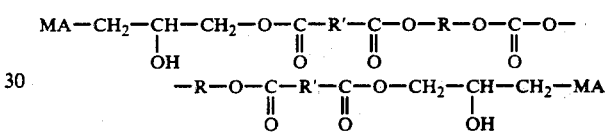

wherein R' is an aliphatic or cycloaliphatic radical, which radicals can optionally contain double bonds, or an aromatic radical, and R is as defined above.

Preferably, carboxylic acid anhydrides are used wherein R' is a radical of the formula —CH=CH—; —CH=CH—(CH$_2$)$_n$—; —CH$_2$—(CH$_2$)m—CH$_2$—;

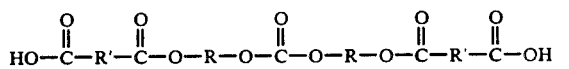

wherein n is 1–2 and m is 0–4.

In the reaction with the bishydroxyalkyl carbonates the dicarboxylic acids or their derivatives can be used either alone or in combination with each other.

In the production of the reaction products of glycidyl (meth)acrylate and the above-described half esters containing carbonate groups, which are used for the adhesives and sealing compounds of the invention, the glycidyl (meth) acrylate and the half ester are heated together, preferably in the presence of oxygen, as e.g. by passing through air, at temperatures between 60° and 120° C., for about ½ to 8 hours.

Since polymerization cannot be completely excluded, in the production of the above reaction products, particularly at elevated temperatures, it is advisable to add known inhibitors, like hydroquinone. Furthermore, alkaline catalysts can be added to reduce the reaction time. These are preferably compounds which dissolve easily in the reaction mixture, e.g. quaternary ammonium compounds, like trimethylbenzyl ammonium hydroxide, trimethylphenyl ammonium hydroxide, tetraethyl ammonium hydroxide, trimethylbenzyl ammonium methoxide, trimethylbenzyl ammonium bromide, and the like.

In the specification and claims, the term "di(meth)acrylic ester(s) containing carbonate groups" is used to designate the above-described reaction products of glycidyl (meth)acrylates and the half esters. They are characterized by the formula

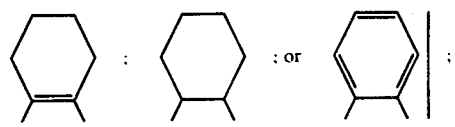

wherein R and R' are as defined above and MA is the (meth) acrylic acid-derived radical. The di(meth)acrylic esters containing carbonate groups have a relatively uniform constitution. They can be characterized on the basis of known physical methods. They are colorless or yellow-colored highly viscous substances which do not tend to polymerize in the cold.

The adhesives and sealing compounds, according to the invention can contain up to 90% by weight of the above mentioned di(meth)acrylic esters containing carbonate groups, based on the total weight of the polymerizable portions of the composition. According to a preferred embodiment, they contain in addition 10 to 40% by weight, based on the total weight of polymerizable portions, of cycloaliphatic, heterocyclic, or aliphatic (meth)acrylic acid esters. These cycloaliphatic, heterocyclic or aliphatic (meth)acrylic acid esters can contain free OH-groups. Particularly suitable such esters containing free OH-groups are the monoesters of polyvalent alcohols having 2-6 carbon atoms, such as the hydroxyalkylmethacrylates, e.g., hydroxyethyl- and 2-hydroxypropyl-methacrylate.

These cycloaliphatic, heterocyclic, or aliphatic (meth)acrylic esters as components of anaerobic systems have been known for a long time. They are composed, for example, of (meth)acrylic esters of mono- or polyvalent alcohols, such as ethylene glycol; diethylene glycol; triethylene glycol; tetraethylene glycol; polyethylene glycol; glycerin; tri-methylol propane; pentanediol; di-, tri-, or tetrapropylene glycol; or the (meth)acrylic esters of dimerized or polymerized cyclopentadienol; tetrahydrofurfuryl alcohol, cyclopentanol, methylcyclopentanol, cyclohexanol, methylcyclohexanol, 1,3-dioxa-2,2-dimethyl-4-methylol-cyclopentane or 4-methylolcyclohexane. The reaction products of glycide ethers of polyvalent phenols with acrylic acid or (meth) acrylic acid provide another group of anaerobically hardening adhesives. Those (meth) acrylic esters containing free OH-groups have been found to be very useful, as e.g. hydroxyethyl methacrylate, and 2-hydroxypropyl methacrylate. Satisfactory results are also obtained with esters produced by reacting (meth)acrylic acid with dimerized cyclopentadiene, i.e., (meth)acrylic acid esters of the isomeric dihydrodicyclopentadienols.

Among the cycloaliphatic, heterocyclic or aliphatic (meth)acrylic esters, particularly suitable are monomethacrylates such as tetrahydrofurfuryl methacrylate, 5,6-dihydrocyclopentadienyl methacrylate, cyclohexylmethacrylate, ethylhexyl methacrylate, hydroxyethyl methacrylate, hydroxypropyl methacrylate; the methacrylic acid esters of glycerin or trimethylol propane; and dimethacrylates, such as ethylene glycol dimethacrylate, triethyleneglycol dimethacrylate, and polyethylene glycol dimethacrylate.

In a preferred embodiment, the compositions of the invention consist of mixtures of 70–80% of the dimethacrylic ester containing carbonate groups and 20–30% of mono(meth)acrylates. A favorable effect on the properties of a cemented joint has also been realized by addition to the mixtures according to the invention of small amounts of polymerizable carboxylic acids containing double bonds, such as alkenoic acids having 3 to 6 carbon atoms, like methacrylic acid, acrylic acid, etc. in an amount of 0.1 to 5% by weight, based on the total weight of the polymerizable portions of the composition. Methacrylic acid has been found to be especially useful.

Another essential component of the anaerobically hardening compositions are the peroxide initiators. These are preferably hydroperoxides which derive from hydrocarbons with a chain length of 3 to 18 carbon atoms. Suitable, for example, are cumene hydroperoxide, tert.-butyl hydroperoxide, methyl ethyl ketone hydroperoxide, and diisopropyl benzene hydroperoxide, especially cumene hydroperoxide. Furthermore those peroxides are also suitable which have a half life period of 10 hours at a temperature between about 80° and 140° C. Here we mention particularly tert.-butyl perbenzoate, di-tert.-butyl-diperoxyphthalate, 2,5-dimethyl 2,5-bis-(tert-butylperoxy)-hexane, bis-(1-hydroxy-cyclohexyl)-peroxide, tert-butyl-peroxyacetate, 2,5-dimethyl-hexyl-2,5-di-(peroxybenzoate), tert.-butylperoxy-isopropyl carbonate, n-butyl-4,4-bis-(tert.-butylperoxy) valerate, 2,2-bis-(tert.-butylperoxy)-butane and di-tert.-butyl peroxide.

The peroxides should be present in an amount of 0.1% to 20%, preferably 1.0% to 10%, based on the total weight of the polymerizable portions of the compositions. They are used mostly as phlegmatized (i.e. thickened) solutions or pastes, that is, with a relatively low content of inert substances, for example, dimethyl phthalate, cumene or the like.

The adhesives may also contain small amounts of auxiliary compounds such as are customarily present in adhesives of this type, such as stabilizers and, if desired, accelerators.

According to a preferred embodiment of the invention, stabilizers are added to the anaerobically hardening mixtures, particularly if they contain arylalkyl- and/or dialkyl hydrazones. The stabilizers prevent premature polymerization; that is, they improve the stability of the compositions during storage. Beyond that, they have an accelerating effect on the polymerization of the (meth)acrylic esters under anaerobic conditions. The stabilizers thus possess a double function. Suitable substances which have these properties are, for example, aliphatic monopercarboxylic acids, preferably the alkyl monopercarboxylic acids with 2–8 carbon atoms in the alkyl radical, (particularly peracetic acid) and nitrones, like C-phenyl-N-methyl-nitrone. Aromatic per acids can also be used, such as perbenzoic acid and perphthalic acid. The use of small amounts (e.g., 0.05% to 5.0%, preferably 0.05 to 3%, by weight of the (meth) acrylic esters) is generally sufficient.

In addition to the foregoing, the composition may contain a free radical stabilizer, to prevent gelations when oxygen alone is insufficient for the purpose. Quinones (for example, hydroquinone) are preferred stabilizers for this purpose. These quinone inhibitors can be used in concentrations of 100–1000 ppm, preferably 200–500 ppm, of the polymerizable portions of the compositions.

As a rule, the stabilizers are added as the last ingredient to the composition.

According to a preferred embodiment of the invention accelerators are added to the compositions. Suitable accelerators include organic amines, particularly tertiary amines, carboxylic hydrazides, N,N-dialkyl hydrazines, carboxylic sulfimides, and mercaptans such as octyl mercaptan or dodecyl mercaptan. The accelerators are generally present only in small quantities (appoximately 0.1% to 5% by weight of the polymerizable portions of the compositions). In this instance the compositions exhibit their best properties with reference to a fast setting time. As amines aliphatic or aromatic tertiary amines, for example, triethylamine, dimethylaniline, N,N-dimethyl-o-toluidine, N,N-dimethyl-p-toluidine, and tri-n-butylamines, are suitable. The hydrazides of acetic acid and of benzoic acid are examples of suitable hydrazides. Among the sulfimides, benzoic acid sulfimide is preferred.

Among other accelerators useful in the invention may be mentioned aromatic hydrazines, such as 4-nitrophenylhydrazine and 2,4-dinitrophenylhydrazine; hydrazones such as acetophenone hydrazone, benzaldehyde hydrazone, methyl ethyl ketone hydrazone, methyl isobutyl ketone hydrazone, and diacetyl hydrazone; sulfonyl hydrazones such as methyl ethyl ketone tosyl hydrazone, acetone tosylhydrazone, cyclohexanone tosyl hydrazone and acetoacetic ester tosyl hydrazone; organic disulfonamides; more especially diaromatic sulfonamides, such as di-p-tosylsulfonamide; and organic sulfonic acid hydrazides such as benzenesulfonic acid hydrazide and p-toluenesulfonic acid hydrazide. In the use of the accelerators mentioned in this paragraph it is helpful to use organic amines, as e.g. N,N-dimethyl toluidine either as an auxiliary or principal accelerator. In this case the systems show their best properties regarding a rapid hardening time.

A class of particularly effective accelerators are the organic sulfohydrazides, especially the aryl sulfonic acid hydrazides. Preferred among these are benzenesulfonic acid hydrazide and p-toluenesulfonic acid hydrazide, most preferably p-toluenesulfonic acid hydrazide. These sulfohydrazide accelerators display special effectiveness in combination with tertiary amines, preferably N,N-dimethyl-p-toluidine.

The combination of a sulfohydrazide accelerator in combination with a tertiary amine and peracetic acid as stabilizer is a very appropriate accelerator stabilizer combination for the instant invention, as e.g. p-toluenesulfonic acid hydrazide in combination with N,N-dimethyl-p-toluidine and peracetic acid.

Accelerators and stabilizers must be added in amounts adjusted to each other to obtain optimum properties. They can be easily adapted to each other by simple preliminary tests to obtain an optimum hardening time and good stability.

The components of the adhesive compositions of the present invention, including initiators, inhibitors, stabilizers, accelerators and esters, are mutually soluble or homogeneously dispersible.

An example of a preferred embodiment of the anaerobically hardening compositions of the invention consists of a di(meth)acrylic ester or mixed ester containing carbonate groups; mono(meth)acrylate(s), which can be substituted by free hydroxy group(s); a polymerizable carboxylic acid; an organic peroxide; an accelerator; and a stablizer.

Furthermore, thickeners, softeners, plasticizers, inorganic fillers, and coloring matter can also be added to the adhesive and sealing compounds according to the invention. Suitable thickening agents are polymeric compounds based on styrene or (meth)acrylic polymers, such as the ester-soluble poly (lower alkyl) acrylates and methacrylates, as e.g. polymethyl methacrylate and polyethyl acrylate, and ester-soluble polyvinyl hydrocarbons such as polystyrene, as well as polyvinyl chloride, synthetic rubber and the like. They are generally used in amount sufficient to give the composition a paste-like viscosity.

Among the fillers and colorants may be mentioned, e.g. finely-divided silicon dioxide, silicates, such as calcium silicate, bentonites, calcium carbonate, and titanium dioxide; and soluble dyes in amounts appropriate for the purpose.

The adhesive and sealing compositions according to the invention are produced by mixing the components at room temperature. These compositions have excellent storage stability in air or oxygen. They are stable for months or years if they are kept in vessels that are permeable to air, like polyethylene bottles. They can further be stored in only partly-filled bottles of glass, polyethylene, etc., without undergoing any change, a relatively low oxygen-partial pressure sufficing to inhibit polymerization. The bottles can also be colored to keep out short-wave light, which has a favorable effect on the stability.

The anaerobically hardening compositions of the present invention are used in the industry for cementing metal sheets or metal parts of different materials, as e.g. for the cementing of screws and bolts in their threads, the sealing of screw-connections, nipples, etc., the cementing of plug connections, the sealing of flanges, the assembly of intricate metal shapes, sealing pipe joints, etc. Assemblies of metals such as iron, brass, copper and aluminum can be bonded to each other. Small quantities of the adhesive compositions are introduced between the surfaces to be bonded, after which the surfaces are contacted with each other sufficiently firmly or in another manner so as to exclude air or oxygen. Then the compositions of the invention polymerize rapidly forming a firm bond. It is naturally also possible to accelerate the hardening with known means, as e.g. by heating the joint.

When the adhesives of the present invention are to be used for adhering or sealing glass or plastics or metals which are less catalytically active (for example, zinc, cadmium, high-alloyed steels and anodized aluminum), it is advantageous to pretreat these materials with metallic salt accelerators (for example, copper naphthenate and cobalt naphthenate.

Among the advantages of the adhesive and sealing compositions according to the present invention are the following. Elevated temperatures are not required for hardening. The parts joined together can after a short time already be subject to heavy loading. In addition to ferrous materials, aluminum parts can also be cemented together with good strength. The thermal stability and flexibility of the cemented joint are excellent. The adhesives and sealing compositions according to the invention are particularly suitable for joining metals where great strength, and good thermal stability and flexibility of the cemented joint are required.

In the specification and claims the terms "(meth)acrylate(s)" and "(meth)acrylic ester(s)" are used to designate esters of acrylic anc esters of methacrylic acid. The esters of methacrylic acids are preferred. The esters are termed latent adhesives because they do not develop their adhesive properties until they have polymerized.

The invention is further described in the examples which follow. These examples are preferred embodiments of the invention are are not to be construed in limitation thereof.

TESTING METHODS

The anaerobically hardening compositions produced according to the following Examples 1-4, on subsequent pages 20 to 24 of this application, were subjected to the following tests:

(A) STABILITY TEST:

In the stability test, test tubes of 10 cm length and 10 mm width were 9/10 filled with the mixtures according to Examples 1 to 8, and suspended in a bath kept at 80° C. The time interval from the suspension to the first formation of a gel was measured. All samples were still gel-free after 60 minutes.

(B) TENSILE SHEARING STRENGTH:

The tensile shearing strength was measured (according to DIN 53283) using a tensile testing machine (feed = 20 mm/min) on steel plates (100 × 20 × 1.5 mm) which had been sand blasted at the place intended for the adhesive, and adhered to one another by means of the composition of the invention with a simple overlapping (DIN 1541/ST 1203) and on aluminum plates (DIN 1783, AlCuMg, 2 pl., 100 × 25 × 1.5 mm) which had been likewise adhered to one another with an overlapping length of 10 mm. The samples were tested as described above after hardening for 72 hours at room temperature.

(C) THERMAL STABILITY:

In the thermal stability test a few drops of the anaerobically hardening adhesive were placed on the threads of a degreased bolt (M10X30DIN 933-8.8) and the appropriate nut (M10DIN 934–5.6) was screwed over the bolt. The cemented nut and bolt were allowed to harden for 3 days at room temperature and thereafter stored for 3 days in a drying oven at 150° C. The torque necessary to break the adhesive joint was then determined with a torque wrench.

D. FLEXIBILITY IN BENDING TEST:

For determining the flexibility of the samples a three-point bending test was used. Steel plates (DIN 1541 ST 1405, 100 × 20 × 0.88 mm) were adhered to one another by means of the composition of the invention with a simple overlap (2 cm$^2$) and, after hardening for 72 hours at room temperature, were bent in the center of the overlap over a mandrel (dia. 10 mm) until they broke. The angle at which the point came apart was measured. Such angle represents a measure of the flexibility of the cemented joint.

All the above tests were repeated 5 times. The mean values of the five measurements are given in the Examples which follow.

EXAMPLE 1

30 gm (0.2 mole) of bishydroxyethyl-carbonate were reacted at 100° C. in an atmosphere of nitrogen with 39.2 gm (0.4 mole) of maleic anhydride. After 7 hours the acid number was 317. This bismaleic acid ester of bishydroxyethyl carbonate was reacted at 80° C. in the presence of 200 ppm hydroquinone and 0.2 ml of benzyltrimethyl ammonium methoxide (40% methanolic solution) with 50.5 gm of glycidylmethacrylate while air was passed through the reaction mixture. The acid number after 8 hours was 15. 102 gm of a yellow product of medium viscosity was obtained.

Using the dimethacrylic ester containing carbonate groups obtained as above, an anaerobically hardening cement of the following composition was prepared:

70 gm of the dimethacrylate ester containing carbonate groups,
20 gm of hydroxyethyl methacrylate,
1 gm of p-toluenesulfonic acid hydrazide,
1 gm of N,N-dimethyl-p-toluidine,
5 gm of a 70% solution of cumene hydroperoxide in cumene
1 gm of a 40% solution of peracetic acid in acetic acid,
3 gm of methacrylic acid This anaerobically hardening cement was tested in accordance with the above described Testing Methods B-D and the following mean values were obtained:

Tensile Shearing Strength on Steel: 245 kp/cm$^2$
Tensile Shearing Strength on Aluminum: 147 kp/cm$^2$
Thermal Stability: 280 kp cm
Flexibility In Bending Test: 100 deg.

EXAMPLE 2

30 gm (0.2 mole) of bishydroxyethyl carbonate were reacted with 59 gm (0.4 mole) of phthalic anhydride at 100° C. in an atmosphere of nitrogen. After a reaction period of 7 hours the acid number was 254. This bisphthalic acid ester of bishydroxyethyl carbonate was reacted at 80° C. in the presence of 200 ppm hydroquinone and 0.2 ml of benzyl-trimethyl ammonium methoxide (40% solution in methanol) with 53.7 gm of glycidyl methacrylate. During the reaction air was passed through the reaction mixture. The acid number after 7 hours was 11. 120 gm of a yellow dimethacrylic acid ester containing carbonate groups were obtained.

Using the dimethacrylic ester containing carbonate groups obtained as above, an anaerobically hardening cement of the following composition was prepared:

70 gm of the dimethacrylic ester containing carbonate groups,
20 gm of tetrahydrofurfuryl methacrylate,
1 gm of p-toluenesulfonic acid hydrazide,
1 gm of N,N-dimethyl-p-toluidine,
5 gm of a 70% solution of cumene hydroperoxide in cumene,
1 gm of a 40% solution of peracetic acid in acetic acid,
3 gm of methacrylic acid.

This anaerobically hardening cement was tested in accordance with the above described Testing Methods B-D and the following mean values were obtained:

Tensile Shearing Strength on Steel: 233 kp/cm$^2$
Tensile Shearing Strength on Aluminum: 156 kp/cm$^2$
Thermal Stability: 140 kp cm
Flexibility In Bending Test: 120 deg.

EXAMPLE 3

182 gm of a reaction product of bishydroxyethyl carbonate and ethylene glycol (hydroxyl number 1,230) were reacted at 100° C. in an atmosphere of nitrogen with 262 gm (2.7 mole) of maleic anhydride and 197 gm (1.3 mole) of phthalic anhydride. After 9 hours the acid number was 355. 625 gm of reaction product were obtained. 80 gm of this mixed ester of maleic acid and phthalic acid with bishydroxyethyl carbonate and ethylene glycol were reacted at 80° C. with 72 gm of glycidyl methacrylate in the presence of 200 ppm of hydroquinone and 1.5 ml of benzyl trimethyl ammonium methoxide (40% solution in methanol).

During the reaction air was passed through the reaction mixture. After a reaction period of 7 hours the acid number was 7. 140 gm of a yellowish, highly viscous product were obtained.

Using the dimethacrylic ester containing carbonate groups obtained as above, an anaerobically hardening cement of the following composition was prepared:

70 gm of the dimethacrylic acid mixed ester (as described above) containing carbonate groups,
20 gm of hydroxyethyl methacrylate,
0.5 gm of p-toluenesulfonic acid hydrazide
0.5 gm of N,N-dimethyl-p-toluidine,
5 gm of a 70% solution of cumene hydroperoxide in cumene,
1.5 gm of a 40% solution of peracetic acid in acetic acid,
3 gm of methacrylic acid.

This anaerobically hardening cement was tested in accordance with the above described Testing Methods B-D and the following mean values were obtained:

Tensile Shearing Strength on Steel: 243 kp/cm$^2$
Tensile Shearing Strength on Aluminum: 141 kp/cm$^2$
Thermal Stability: 220 kp cm
Flexibility In Bending Test: 110 deg.

EXAMPLE 4

309 gm (1.5 moles) of bishydroxybutyl carbonate were reacted at 100° C. in an atmosphere of nitrogen with 196 gm (2 moles) of maleic anhydride and 148 gm (1 mole) of phthalic anhydride. After 9 hours 660 gm of a product with an acid number of 265 were obtained. 80 gm of these mixed esters of maleic acid and phthalic acid with bishydroxybutyl carbonate were reacted at 80° C. with 54 gm of glycidyl methacrylate in the presence of 200 ppm hydroquinone and 1.5 ml of benzyl trimethylammonium methoxide (40% solution in methanol). After a reaction period of 5 hours the acid number was 1.125 gm of a dimethacrylic acid ester containing carbonate groups were obtained.

Using the dimethacrylic ester containing carbonate groups obtained as above, an anaerobically hardening cement of the following composition was prepared:
70 gm of the dimethacrylic acid mixed esters containing carbonate groups (see above)
20 gm of hydroxyethyl methacrylate,
0.5 gm of p-toluenesulfonic acid hydrazide
0.5 gm of N,N-dimethyl-p-toluidine
5 gm of a 70% solution of cumene hydroperoxide in cumene
1.5 gm of a 40% solution of peracetic acid in acetic acid,
2.5 gm of methacrylic acid.

This anaerobically hardening cement was tested in accordance with the above described Testing Methods B-D and the following mean values were obtained:
Tensile Shearing Strength on Steel: 237 kp/cm$^2$
Tensile Shearing Strength on Aluminum: 135 kp/cm$^2$
Thermal Stability: 180 kp cm
Flexibility In Bending Test: 100 deg.

We claim:
1. An anaerobically setting adhesive and sealing composition comprising
   (a) 10 to 40% by weight, based on the total weight of the polymerizable portions of the composition, of methacrylic or acrylic acid esters,
   (b) 0.1 to 20% by weight, based on the total weight of the polymerizable portions of the composition, of organic hydroperoxides, and
   (c) 10 to 90% by weight, based on the total weight of the polymerizable portions of the composition, of a di(meth)acrylic ester containing carbonate groups of the general formula

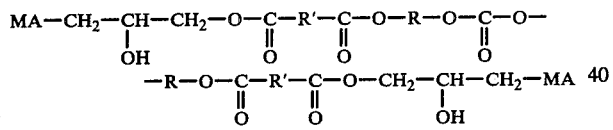

wherein R is a saturated or unsaturated aliphatic hydrocarbon radical with 2 to 8 carbon atoms and R' is a member selected from the group consisting of alkylene having 2 to 6 carbon atoms, alkenylene having 2 to 6 carbon atoms, cycloalkylene having 5 to 8 carbon atoms, cycloalkenylene having 5 to 8 carbon atoms, endoalkylenecycloalkenylene having 7 to 8 carbon atoms, phenylene, and mixtures thereof, and MA is the (meth)acrylic acid derived radical.

2. The composition according to claim 1 which additionally contains 0.05 to 3.0% by weight, based on the total weight of the polymerizable portions of the composition, of a stabilizer selected from the group consisting of aliphatic monopercarboxylic acids, nitrones and aromatic per acids.

3. The composition according to claim 1 which additionally contains 0.1 to 5% by weight, based on the total weight of the polymerizable portions of the composition, of an accelerator or accelerators selected from the group consisting of organic amines, carboxylic hydrazides, N,N-dialkyl hydrazines, carboxylic sulfimides, mercaptans, aromatic hydrazines, hydrazones, organic disulfonamides, and organic sulfonic acid hydrazides.

4. The composition according to claim 1 which additionally contains 0.1 to 5% by weight, based on the total weight of the polymerizable portions of the composition, of an accelerator or accelerators selected from the group consisting of organic amines, carboxylic hydrazides, N,N-dialkyl hydrazines, carboxylic sulfimides, mercaptans, aromatic hydrazines, hydrazones, organic disulfonamides, and organic sulfonic acid hydrazides and 0.05 to 3.0% by weight, based on the total weight of the polymerizable portions of the composition, of a stabilizer selected from the group consisting of aliphatic monopercarboxylic acids, nitrones and aromatic per acids.

5. The composition according to claim 1 wherein the hydroperoxide is cumene hydroperoxide.

6. The composition according to claim 1 which additionally contains 0.1 to 5% by weight, based on the total weight of the polymerizable portions of the composition, of polymerizable alkenoic acids having 3 to 6 carbon atoms.

7. The composition according to claim 1 which additionally contains ordinary auxiliary substances selected from the group consisting of
   (a) 100–1000 ppm, based on the total weight of the polymerizable portions of the composition, of quinones,
   (b) 0.05 to 5% by weight, based on the total weight of the polymerizable portions of the composition, of stabilizers selected from the group consisting of aliphatic monopercarboxylic acids, nitrones and aromatic per acids,
   (c) 0.1 to 5% by weight, based on the total weight of the polymerizable portions of the composition, of accelerators selected from the group consisting of organic amines, carboxylic hydrazides, N,N-dialkyl hydrazines, carboxylic sulfimides, mercaptans, aromatic hydrazines, hydrazones, organic disulfonamides, and organic sulfonic acid hydrazides, and
   (d) mixtures thereof.

8. The composition according to claim 1 which additionally contains 0.1 to 5% by weight, based on the total weight of the polymerizable portions of the composition, of polymerizable alkenoic acids having 3 to 6 carbon atoms and ordinary auxiliary substances selected from the group consisting of
   (a) 100–1000 ppm, based on the total weight of the polymerizable portions of the composition, of quinones,
   (b) 0.05 to 5% by weight, based on the total weight of the polymerizable portions of the composition, of stabilizers selected from the group consisting of aliphatic monopercarboxylic acids, nitrones and aromatic per acids,
   (c) 0.1 to 5% by weight, based on the total weight of the polymerizable portions of the composition, of accelerators selected from the group consisting of organic amines, carboxylic hydrazides, N,N-dialkyl hydrazines, carboxylic sulfimides, mercaptans, aromatic hydrazines, hydrazones, organic disulfonamides, and organic sulfonic acid hydrazides, and
   (d) mixtures thereof.

9. The composition according to claim 1 which contains 10 to 40% by weight, based on the total weight of the polymerizable (meth) acrylic acid esters of the composition, of (meth) acrylic acid esters selected from the group consisting of cycloaliphatic, heterocyclic, or aliphatic (meth) acrylic acid esters and of cycloaliphatic, heterocyclic, or aliphatic (meth) acrylic acid esters substituted by free hydroxy groups.

10. The composition according to claim 9 wherein the (meth) acrylic acid esters selected from the group consisting of cycloaliphatic, heterocyclic, or aliphatic (meth) acrylic acid esters and of cycloaliphatic, heterocyclic, or aliphatic (meth) acrylic acid esters substituted by free hydroxy groups, are mono-esters of polyvalent alcohols with 2 to 6 carbon atoms.

11. The composition according to claim 9 which contains
   (1) 20 to 30% by weight of a member selected from the group consisting of cycloaliphatic, heterocyclic or aliphatic mono (meth) acrylic acid esters and of cycloaliphatic, heterocyclic, or aliphatic mono (meth) acrylic acid esters substituted by free hydroxy groups, and
   (2) 70 to 80% by weight of the di(meth)acrylic ester containing carbonate groups.

12. The composition according to claim 9 wherein said (meth) acrylic acid ester is a mono (meth) acrylic acid ester.

13. The composition according to claim 9 wherein said (meth) acrylic acid ester is a member selected from the group consisting of tetrahydrofurfuryl methacrylate, 5,6-dihydrocyclopentadienyl methacrylate, cyclohexyl methacrylate, ethylhexyl methacrylate, hydroxyethyl methacrylate, hydroxypropyl methacrylate, the methacrylic acid esters of glycerin or trimethylol propane, ethylene glycol dimethacrylate, triethyleneglycol dimethacrylate, and polyethylene glycol dimethacrylate.

14. The composition according to claim 13 wherein R' is a member selected from the group consisting of —CH=CH—, —CH=CH—(CH$_2$)$_n$—, —CH$_2$—(CH$_2$)$_m$—CH$_2$—,

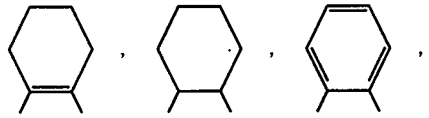

and mixtures thereof, wherein $n$ is 1–2 and $m$ is 0–4.

15. The composition according to claim 14 which additionally contains
   (1) 0.1 to 5% by weight, based on the total weight of the polymerizable portions of the composition, of methacrylic acid,
   (2) 0.05 to 5% by weight, based on the total weight of the polymerizable portions of the composition, of stabilizers selected from the group consisting of aliphatic monopercarboxylic acids, nitrones and aromatic per acids, and
   (3) 0.1 to 5% by weight, based on the total weight of the polymerizable portions of the composition, of accelerators selected from the group consisting of organic amines, carboxylic hydrazides, N,N-dialkyl hydrazines, carboxylic sulfimides, mercaptans, aromatic hydrazines, hydrazones, organic disulfonamides, and organic sulfonic acid hydrazides.

16. The composition according to claim 15 wherein
   (1) said (meth) acrylic acid ester is a member selected from the group consisting of hydroxyethyl methacrylate and tetrahydrofurfuryl methacrylate,
   (2) in said di(meth)acrylic ester containing carbonate groups R is a member selected from the group consisting of ethylene and butylene and R' is a member selected from the group consisting of —CH=CH—,

and mixtures thereof,
   (3) the organic hydroperoxide is cumene hydroperoxide,
   (4) the stabilizer is peracetic acid, and
   (5) the accelerator is a member selected from the group consisting of p-toluenesulfonic acid hydrazide, N,N-dimethyl-p-toluidine, and mixtures thereof.

17. The composition according to claim 11 which additionally contains from 0.1 to 5% by weight, based on the total weight of the polymerizable portions of the composition, of a polymerizable alkenoic acid having 3 to 6 carbon atoms.

18. The composition according to claim 17 wherein the polymerizable alkenoic acid is selected from the group consisting of methacrylic acid and acrylic acid.

19. The composition according to claim 2, wherein the stabilizer is peracetic acid.

20. The composition according to claim 4 which contains p-toluenesulfonic acid hydrazide, N,N-dimethyl-p-toluidine and peracetic acid.

* * * * *